(12) United States Patent
Iijima et al.

(10) Patent No.: US 6,382,778 B1
(45) Date of Patent: May 7, 2002

(54) INK JET RECORDING HEAD AND METHOD OF MANUFACTURING THE SAME

(75) Inventors: Takayuki Iijima; Tsuyoshi Kitahara; Noriaki Okazawa, all of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/494,173

(22) Filed: Jan. 31, 2000

(30) Foreign Application Priority Data

| Jan. 29, 1999 | (JP) | 11-023301 |
| Jan. 29, 1999 | (JP) | 11-023302 |
| Jan. 29, 1999 | (JP) | 11-023303 |
| Dec. 28, 1999 | (JP) | 11-372105 |

(51) Int. Cl.⁷ .............. B41J 2/05; B41J 2/175
(52) U.S. Cl. .............. 347/65; 347/63; 347/86
(58) Field of Search .............. 347/47, 65, 86, 347/87

(56) References Cited

U.S. PATENT DOCUMENTS

| 4,301,585 A | 11/1981 | Ikeda | 29/157 |
| 5,581,288 A * | 12/1996 | Shimizu et al. | 347/87 |
| 5,847,736 A | 12/1998 | Kanbayashi et al. | |

FOREIGN PATENT DOCUMENTS

| DE | 3418201 A1 | 11/1985 | B41J/3/04 |
| EP | 0 315 417 A2 | 5/1989 | B41J/3/04 |
| EP | 0 822 078 A2 | 2/1998 | B41J/2/14 |
| EP | 0822078 A2 * | 2/1998 | 347/47 |
| EP | 0 832 747 A2 | 4/1998 | B41J/2/175 |
| EP | 0 847 866 A2 | 6/1998 | B41J/25/34 |
| FR | 2 674 914 | 4/1991 | F16B/11/00 |
| FR | 2 714 714 | 1/1994 | F16S/1/02 |
| GB | 2 029 756 A | 3/1980 | B29D/3/00 |
| JP | 61-222724 | 10/1986 | B29C/65/52 |
| JP | 5-50467 | 3/1993 | B29C/45/26 |
| JP | 6-21937 U | 3/1994 | |
| JP | 7-52401 | 2/1995 | B41J/2/175 |
| JP | 8-39826 | 2/1996 | B41J/2/175 |
| JP | 8-323990 | 12/1996 | B41J/2/175 |
| JP | 9-94953 | 4/1997 | B41J/2/045 |
| JP | 9-300646 | 11/1997 | B41J/2/175 |
| JP | 10-166608 | 6/1998 | B41J/2/175 |
| JP | 10-175310 | 6/1998 | B41J/2/175 |

OTHER PUBLICATIONS

Japanese Abstract No. 07 329293 dated Dec. 19, 1995.

* cited by examiner

*Primary Examiner*—John Barlow
*Assistant Examiner*—An H. Do
(74) *Attorney, Agent, or Firm*—Sughrue Mion, PLLC

(57) ABSTRACT

An ink jet recording head having a head body for ejecting ink and ink supply channels for introducing ink supplied from an ink tank to the head body is disclosed. The recording head inventively and uniquely includes a channel forming plate having grooves and a sealing plate fastened to the channel forming plate for closing the openings of the grooves in a sealing fashion to form the channels. The resultant recording head is easy in working and assembling, and reduced in size.

27 Claims, 16 Drawing Sheets

INK JET RECORDING HEAD AND METHOD OF MANUFACTURING THE SAME

BACKGROUND OF THE INVENTION

The present invention relates to an ink jet recording head for ejecting ink supplied from an ink tank in the form of ink drops, and a method of manufacturing the same.

A recording head of an ink jet recording head is composed of a head body for ejecting ink in the form of ink drops and an ink cartridge containing ink to be supplied to the head body. The recording head has an ink supply needle, and the ink cartridge has an ink supply hole. Ink is supplied to the head body through the ink supply needle that is inserted into the ink supply hole.

More precisely, in the recording head, as shown in FIG. 15, for example, a head body 1 for ejecting ink drops in accordance with a print signal is mounted on the lower side of a head holder 10. A cartridge case 12 for receiving an ink cartridge 2 is provided on the upper side of the head holder 10. A positioning protrusion 13 is formed on the lower side of the ink cartridge 2, and an ink supply hole 4 is formed under the positioning protrusion 13. The opening of the ink supply hole 4 is sealed with a film 14 till the ink cartridge 2 is set to the recording head.

A concavity 11 into which the positioning protrusion 13 is fit is formed in the upper side of the head holder 10, and an ink supply needle 3 stands erect in the concavity 11. In a recording head for color printing by use of a plurality of color inks, the ink cartridge 2 includes a plurality of ink chambers 15. As shown in FIG. 16, for example, the ink cartridge includes four ink chambers containing color inks of cyan, magenta, yellow and black. A plurality of ink supply holes 4 are provided in the ink cartridge 2. Specifically, the ink supply hole 4 is provided for each ink chamber 15 (viz., each color). Four ink supply needles 3 are also provided for those colors, respectively. FIG. 16 shows the recording head before the ink cartridge 2 is set to the head.

The tip of each ink supply needle 3 is shaped to be conical so that it can break through a film of the ink supply hole 4. Ink introducing holes 6 are vertically formed in a slanted surface 8 of the tip of the needle. A first ink passage 5, which communicates with the ink introducing holes 6, is formed in the ink supply needle 3. Second ink passages 7 for supplying ink to the head body 1 are formed in the head holder 10. A filter 9 for filtering ink supplied from the ink cartridge 2 is provided at the entrance of each second ink passage 7. In order to guide ink to the head body 1 that is shorter in width than the ink cartridge 2, the second ink passages 7 are obliquely extended toward the head body 1 centered (see FIG. 16).

When the ink cartridge 2 is set to the recording head, the tip of the ink supply needle 3 breaks through the film 14 which sealingly closes the ink supply hole 4 of the ink cartridge 2 and, the ink supply needle 3 is inserted into the ink supply hole 4. Then, in the recording head, ink is supplied from the ink cartridge 2 into the head body 1, through the ink introducing holes 6 of the ink supply needle 3 and the first and second ink passages 5 and 7.

The recording head, together with the ink cartridge 2, is carried on a carriage (not shown), and reciprocatively moved across a recording sheet by the carriage. Ink to be consumed is supplied from the ink cartridge 2 to the head body 1 via the ink supply needle 3 in a replenishing manner. During the widthwise movement of the recording head, the recording head ejects ink drops through its nozzle orifices toward the recording sheet, thereby effecting a print.

In the recording head mentioned above, to guide ink from the ink cartridge 2 to the head body 1 of which the width is shorter than that of the ink cartridge 2, the second ink passages 7 are obliquely extended to the head body 1. To manufacture the recording head, it is necessary to form the slanted holes requiring intricate work. Accordingly, the cost to manufacture will inevitably increase. Since the second ink passages 7 are slanted, there is a limit in reducing the height of the recording head per se. For this reason, the related recording head cannot meet the demand of size reduction in the recent ink jet recording heads.

SUMMARY OF THE INVENTION

Accordingly, an object of the present invention is to provide an ink jet recording head which is easy in working and assembling, low in cost, reduced in size, and is substantially free from entry of air bubbles into passages.

In order to achieve the above object, according to the first aspect of the invention, there is provided an ink jet recording head comprising:

a head body from which ink drops are ejected;

a channel forming plate provided with a groove;

a sealing plate for sealing each opened side of the grooves to form an ink supply channel for supplying ink from an ink tank to the head body.

In the thus constructed recording head, a portion forming the ink supply channel of the recording head is composed of two types of plate-like members. Therefore, the recording head may be remarkably reduced in size when comparing with the related one in which the ink supply channel is formed by use of slanted passage.

According to the second aspect of the invention, in the head according to the first aspect, the channel forming plate integrally includes a holder member for holding the ink tank, and the sealing plate is bonded to the holding member.

In the ink jet recording head, the working and assembling are easy, and cost to manufacture is reduced. In addition, the opened side of the respective grooves are sealed by bonding the sealing plate to the holding member.

According to the third aspect of the invention, in the head according to the first aspect, the channel forming plate is provided as an independent member.

In the ink jet recording head, the working and assembling are easy, and cost to manufacture is reduced.

According to the fourth aspect of the invention, in the head according to the third aspect, the channel forming plate defines at least a bottom portion and side walls of the respective grooves.

In the ink jet recording head, the grooves are formed by the channel forming plate and the sealing plate.

According to the fifth aspect of the invention, in the head according to the third aspect, the channel forming plate includes through holes which respectively define side walls of the grooves.

In the ink jet recording head, the grooves are formed by the channel forming plate, the sealing plate and a member for sealing one opening side of the through hole to define a bottom portion of the grooves.

According to the sixth aspect of the invention, in the head according to the first to fifth aspects, one longitudinal end portion of the respective grooves are communicated with the ink tank, and the other end portions are communicated with the head body.

In the ink jet recording head, the size of head body can be remarkably reduced irrespective of the size of ink tanks due to the arrangement of the grooves.

According to the seventh aspect of the invention, in the head according to the first to sixth aspects, the end portions of the respective grooves communicated with the head body are converged.

In the ink jet recording head, since the end portions of the grooves communicated with the head body are closely arranged, the size of head body can be remarkably reduced irrespective of the size of ink tanks.

According to the eighth aspect of the invention, in the head according to the seventh aspect, plural kinds of ink are ejected from the head body, and the grooves are provided so as to be associated with the ink kind.

In the ink jet recording head, plural kinds of ink can be supplied to the head body through the grooves and ejected therefrom.

According to the ninth aspect of the invention, in the head according to the first to eighth aspects, sealing compound is provided on the channel forming plate at least around the grooves.

In the ink jet recording head, the grooves of the channel forming plate is sealed with sealing compound. Accordingly, the ink supply channel is reliably formed, and there is less chance that dust and the like enter the channel.

According to the tenth aspect of the invention, in the head according to the ninth aspect, the channel forming plate and the sealing plate are fastened together with the sealing compound being located therebetween.

In the ink jet recording head, the groove of the channel forming plate is sealed with sealing compound. Accordingly, the ink supply channel is reliably formed, and there is less chance that dust and the like enter the channel.

According to the eleventh aspect of the invention, in the head according to any one of the first to tenth aspects, the sealing plate is welded to the channel forming plate.

In the ink jet recording head, the sealing plate is welded to the channel forming plate, so that there is less chance that dust and the like enter the ink supply channel. Further, the slanted passage requiring intricate work is not used, and the assembling is easy and manufacturing cost is low.

According to the twelfth aspect of the invention, in the head according to the eleventh aspect, a welding pin is provided on the channel forming plate and a through hole is formed in the sealing plate. The welding is performed by melting the welding pin inserted into the through hole.

In the ink jet recording head, the assembling of the recording head is easy and hence it is easy to make automating of the assembling process of the recording head. Welding residual substances are hard to be produced, while the ultrasonic welding is unlikely to yield them. Chance that dust and others enter the ink supply channel is further lessened.

According to the thirteenth aspect of the invention, in the head according to the twelfth aspect, the welding pin is provided a portion surrounding the grooves.

In the ink jet recording head, if an external force is applied to the sealing plate, the mounting structure of the plate and the channel forming plate is hard to be unsteady and ink leakage is unlikely to occur.

According to the fourteenth aspect of the invention, in the head according to the thirteenth aspect, a plurality of welding pins are provided so as to surround the grooves.

In the ink jet recording head, if an external force is applied to the sealing plate, the mounting structure of the plate and the channel forming plate is hard to be unsteady and ink leakage is unlikely to occur.

According to the fifteenth aspect of the invention, in the head according to any one of the first to fourteenth aspects, a filter for filtering ink supplied from the ink tank is comprised. The ink supply channel guides ink having passed through the filter to the head body.

In the ink jet recording head, no dust enter the ink supply channel which rejects the presence of dust and the like, and the recording head is extremely effective.

According to the sixteenth aspect of the invention, in the head according to any one of the ninth to fifteenth aspects, the sealing compound is made of silicone resin.

In the ink jet recording head, the sealing compound is hard to be deteriorated and aged by ink, and the ink leakage occurs less frequently.

According to the seventeenth aspect of the invention, in the head according to any one of the first to sixteenth aspects, the grooves are defined by a wall portion standing erect on the channel forming plate. A top surface of the wall portion is gradually slanted downward to the grooves.

In the ink jet recording head, the slanted surface being gradually slanted downward to the groove is provided. A gap on a portion of the slanted surface that is formed in a state that the surface of the channel forming plate is sealed with the sealing plate, is satisfactorily small. Accordingly, it can hold the sealing compound satisfactorily, and it is hard to flow over the gap. The recording head is substantially free from the problem of the flow of the sealing compound into the ink supply channel, which is unavoidable in the related recording head. Further, the ink ejection trouble arising from attachment of air bubbles to the sealing compound is also solved.

According to the eighteenth aspect of the invention, in the head according to the seventeenth aspect, a stepped portion on which sealing compound is to be applied is formed on an outer periphery of the wall portion.

In the ink jet recording head, the work to apply the sealing compound to the stepped portion is easy. The overflow of the sealing compound may be prevented by reducing the amount of sealing compound applied. In this case, if the amount of it is excessively reduced, control of the application of the sealing compound is impossible. In an extreme case, the supply of the sealing compound is interrupted, resulting in poor sealing. In this ink jet recording head, the sealing compound is applied to the stepped portion. Therefore, the amount of the sealing compound effectively contributing to the sealing is reduced when the sealing is effected by the sealing plate. For this reason, the overflow of the sealing compound can effectively be prevented without excessively reducing the amount of the sealing compound applied. The control of the amount of the sealing compound applied is also easy, and poor sealing is not caused.

According to the nineteenth aspect of the invention, in the head according to the seventeenth or eighteenth aspect, a slope of the slanted face is selected to be preferably within 5/1000 to 200/1000.

In the ink jet recording head, the gap on a portion of the slanted surface that is formed in a state that the surface of each of the channel forming plate is sealed with the sealing plate, is satisfactorily small. Accordingly, if air bubbles attach to the sealing compound, its amount is considerably small. Removal of the air bubbles from the sealing compound is difficult, thereby preventing poor ejection trouble.

According to the twentieth aspect of the invention, in the head according to the seventeenth or eighteenth aspect, in the head according to any one of the eleventh to thirteenth aspects, a flat portion is provided between the stepped portion and the slanted surface.

In the ink jet recording head, there is no chance of reducing the sealing effect between the channel forming plate and the sealing plate.

According to the twenty-first aspect of the invention, in the head according to the twentieth aspect, a corner demarcating the stepped portion and the flat portion is removed to form a tapered surface.

In the ink jet recording head, when the sealing compound applied to the stepped portion is held down by the sealing plate and spreads to the flat portion, the sealing compound stands on the tapered surface, and there is no excessive flow of the sealing compound to the flat portion. Therefore, prevention of the overflow of the sealing compound into the ink supply channel is further ensured.

According to the twenty-second aspect of the invention, in the head according to any one of the first to twenty-first aspects, the sealing plate is provided with ink supply holes for supplying ink from the respective ink supply channels to the head body. The ink supply holes are bored in the sealing plate obliquely such that an interval of openings of the respective holes on the side facing the channel forming plate is longer than an interval of openings of the respective holes on the side facing the head body. In the ink jet recording head, if the interval of the openings of the respective holes on the side facing the channel forming plate is set to be equal to that of ink supply passages of the head body, the interval of the openings of the respective holes on the side facing the head body becomes longer than that. Accordingly, a sufficient space is present, so that a sufficient width of the channel forming plate is secured in a portion of the channel forming plate corresponding to the ink supply hole. Such a problem of the related recording head that the sealing is poor and the sealing compound flows out into the passages is almost solved. The trouble caused by attaching air bubbles to the sealing compound, for example, poor ejection, is prevented.

According to the twenty-third aspect of the invention, in the head according to the twenty-second aspect, the grooves are defined by a wall portion standing erect on the channel forming plate. The width of the wall portion is 1.0 mm or longer over the entire circumference of the grooves.

In the ink jet recording head, such a problem of the related recording head that the sealing is poor and the sealing compound flows out into the ink supply channels is almost solved. The trouble caused by attaching air bubbles to the sealing compound, for example, poor ejection, is prevented with certainty.

According to the twenty-fourth aspect of the invention, in the head according to the twenty-second or twenty-third aspect, the respective openings of the ink supply holes facing the head body is circular in shape.

In the ink jet recording head, the openings of the ink supply holes of the resultant plate are simple in shape, the manufacturing cost is not high, the sealing performance is not degraded, and air bubbles being caught in the passages less happens. If the ink supply holes obliquely passing through the plate are formed by use of normal pins circular in cross section, the openings of the ink supply holes are elliptical. Therefore, it is necessary to shape the openings of the ink supply pipes of the head body to be elliptical, and hence to shape the packing applied thereto to be also elliptical.

Thus, the elliptical member needs to be used for the other member. The manufacturing cost of the overall device is increased. Further, the sealing is deteriorated, and air bubbles are easy to be caught. On the other hand, in the invention, the openings of the ink supply holes of the sealing plate are circular. Therefore, there is no need of making the elliptical openings of the ink supply pipes and the elliptical packing applied to those. Consequently, the manufacturing cost is low, good sealing is secured, and air bubbles are little caught in the passages.

According to the twenty-fifth aspect of the invention, in the head according to any one of the twenty-second to twenty-fourth aspects, a stepped portion is formed around the respective openings of the ink supply holes facing the channel forming plate.

In the ink jet recording head, there is substantially eliminated the deterioration of the sealing at the openings of the ink supply holes.

According to the twenty-sixth aspect of the invention, there is provided a method of manufacturing the ink jet recording head according to the sixteenth aspect of the invention, comprising the steps of:

disposing supply hole forming pins extending obliquely with respect to an inner face of a mold having a molding space in which the sealing plate is to be formed, the inner face corresponding to a surface of the sealing plate;

filling the molding space with molding material;

solidifying the molding material; and pulling out the supply hole forming pins from the molded product to form the ink supply holes.

When the manufacturing method is used, the ink jet recording head of the invention may be manufactured at low cost and in an easy manner.

According to the twenty-seventh aspect of the invention, in the method according to the twenty-sixth aspect, both tip ends of the respective supply hole forming pins abutting against the inner face of the mold are circular in shape.

When the manufacturing method is used, the openings of the ink supply holes of the resultant plate are simple in shape, the manufacturing cost is not high, the sealing performance is not degraded, and air bubbles being caught in the ink supply channels less happens.

According to the twenty-eighth aspect of the invention, in the method according to the twenty-seventh aspect, one end portion of the respective supply hole forming pins which corresponds to the opening of the ink supply hole facing the channel forming plate is configured to have a large diameter.

When the manufacturing method is used, the stepped potion may be formed around the opening of each ink supply hole in a relatively simple manner. With provision of the stepped portion, the sealing performance is little degraded.

BRIEF DESCRIPTION OF THE DRAWINGS

In the accompanying drawings:

FIG. 4 is a diagram for explaining a structure of the recording head of the first embodiment.

FIG. 6 is a diagram for explaining an assembling of the ink jet recording head of the first embodiment.

FIG. 9 is a diagram for explaining the sealing portion of the channel forming plate and the plate in the recording head which is a second embodiment of the invention.

FIG. 12 is a diagram for explaining a plate in the third embodiment.

FIG. 13 is a diagram for explaining a draw pin.

FIG. 14 is a diagram for explaining a process of manufacturing an ink jet recording head according to an third embodiment of the invention.

FIG. 17 is a cross sectional view showing a related an ink jet recording head.

DETAILED DESCRIPTION OF THE PREFERRED EMBODIMENTS

The preferred embodiments of the invention will be described.

Figure 1:
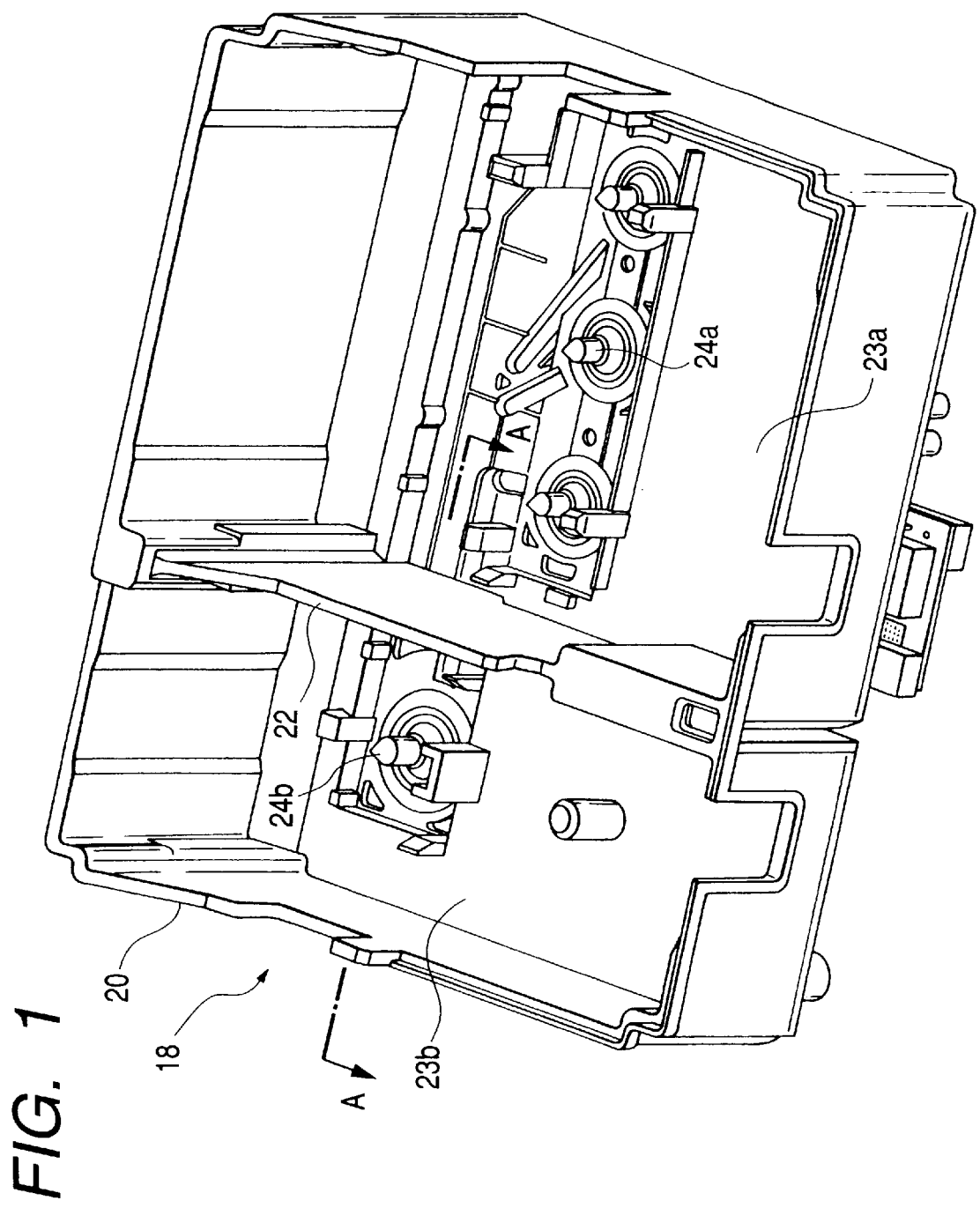
FIG. 1 is a perspective view showing an ink jet recording head according to a first embodiment of the present invention.
Figure 2:
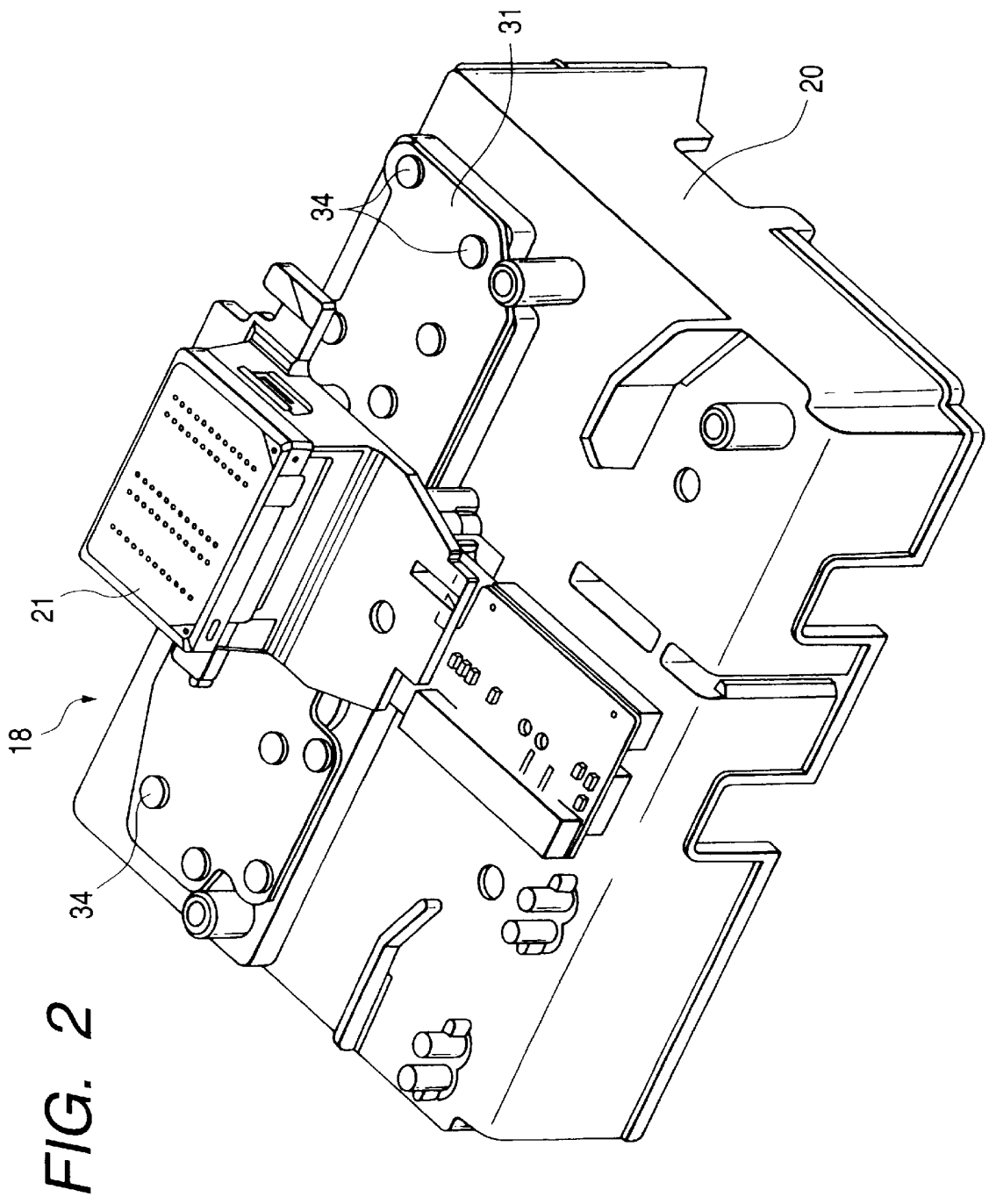
FIG. 2 is a perspective bottom view showing the ink jet recording head of the first embodiment.

FIGS. 1 and 2 show a first example of an ink jet recording head 18 according to an first embodiment of the present invention. The ink jet recording head 18 includes a box-like cartridge case 20 opened at the upper side thereof, and a head body 21 mounted on the lower side of the cartridge case 20.

The cartridge case 20 contains a partition wall 22. The partition wall is located at a position closer to one side of the cartridge case 2 with respect to the center thereof, whereby the inner space to the cartridge case is partitioned into two accommodating chambers 23a and 23b for accommodating ink cartridges. Three ink supply needles 24a stand erect on the bottom of the accommodating chamber 23a, larger in size (located on the right side in FIG. 1). One ink supply needle 24b stands erect on the bottom of the accommodating chamber 23b, small in size (located on the left side in FIG. 1). A first ink cartridge (not shown), which is filled with three color inks of, for example, cyan, magenta and yellow, is accommodated in the large accommodating chamber 23a. A second ink cartridge (not shown), which is filled with black in, is accommodated in the large accommodating chamber 23b.

Figure 3:
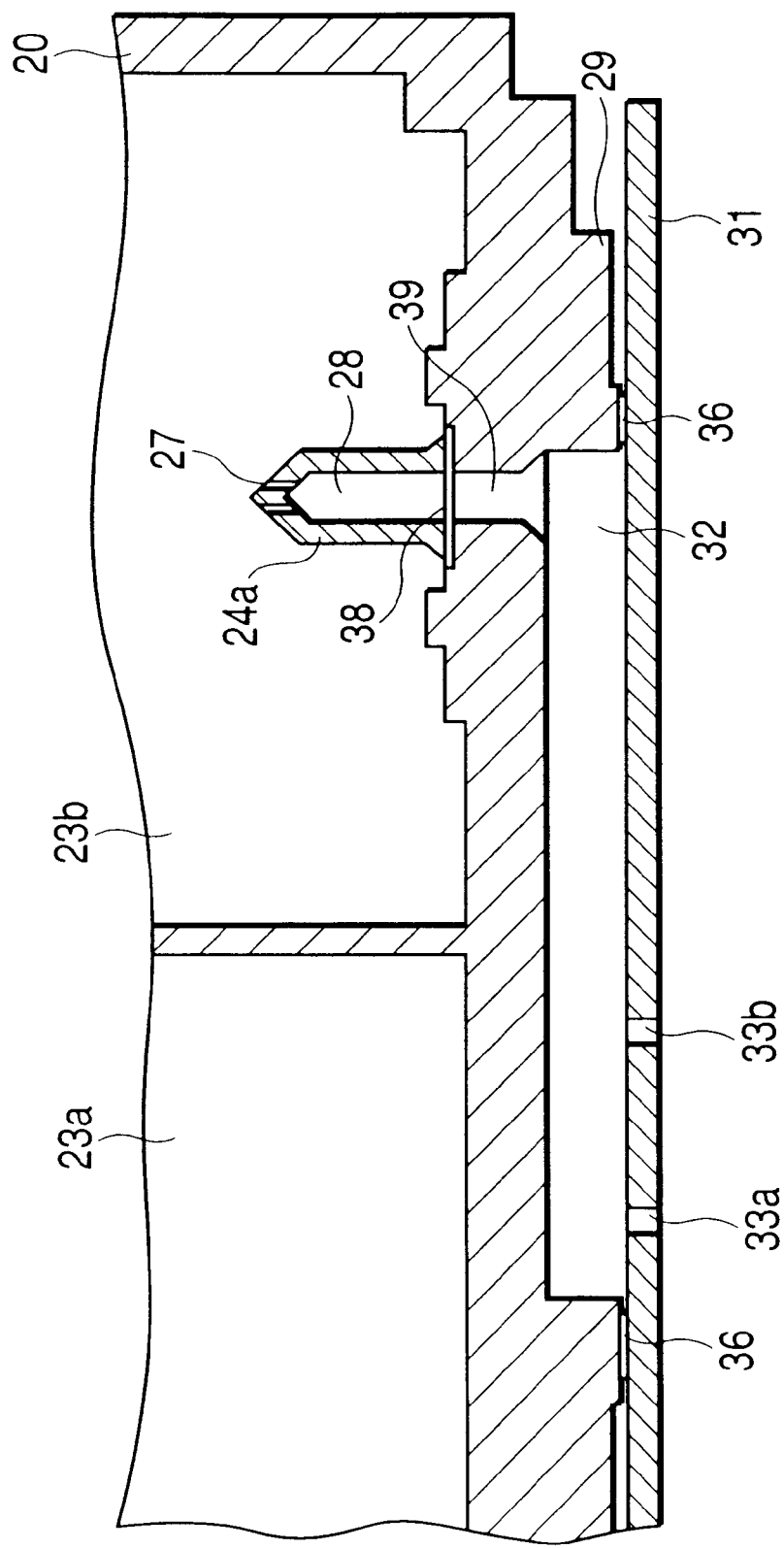
FIG. 3 is a cross sectional view taken along the line A—A of FIG. 1 to show a main portion of the recording head of the first embodiment.

As shown in FIG. 3, the tips of the ink supply needles 24a and 24b are conical in shape. A number of ink introducing holes 27 are vertically formed in the slanted surface of the tip of each ink supply needles. Each of the ink introducing holes 27 communicates with a first ink supply passage 28 vertically extending within each of the ink supply needles 24a and 24b. Second ink supply passages 39, which vertically extend and communicate with the first ink supply passages 28, are formed in locations of the cartridge case 20, which correspond to the ink supply needles 24a and 24b. A filter 38 for filtering ink supplied from the ink cartridge is provided at an incoming part of each second ink supply passage 39 (where is close to the each of the ink supply needles 24a and 24b).

Figure 4A:
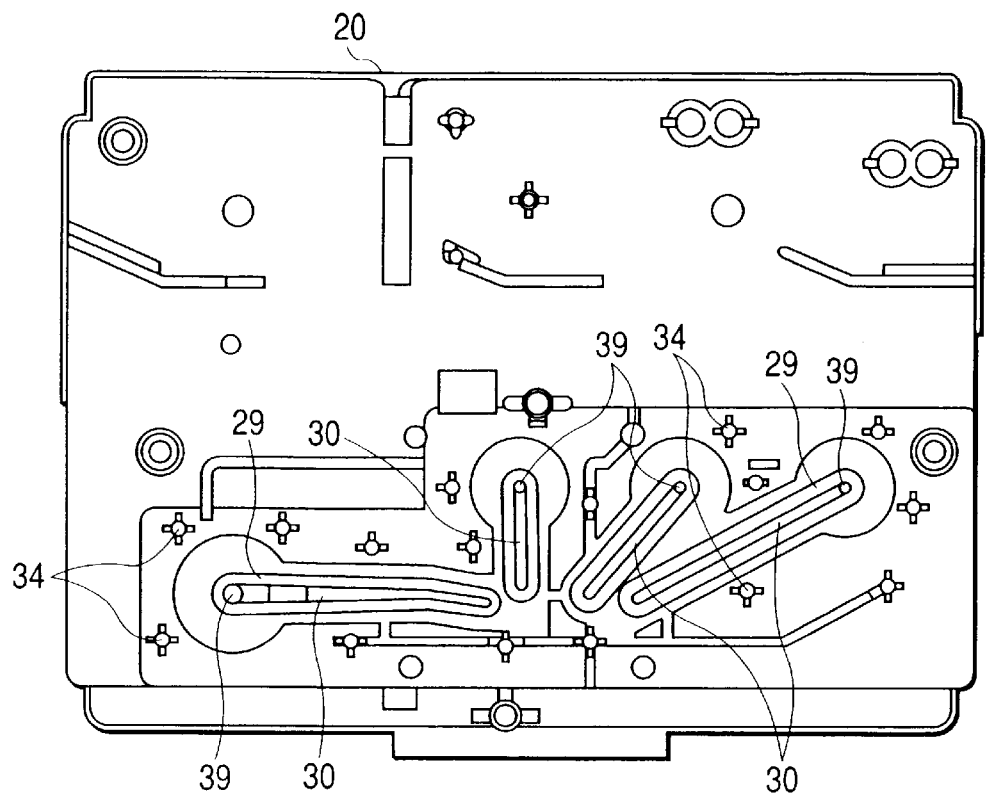
FIG. 4A is a bottom view showing a cartridge case and FIG. 4B is a bottom view showing a plate.
Figure 4B:
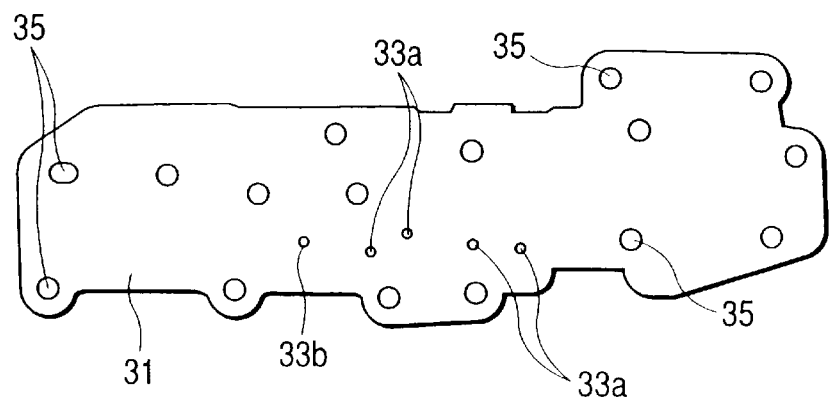

As shown in FIG. 4, four ellipsoidal channel forming plates 29 are integrally formed on the lower side of the cartridge case 20, and grooves 30 that communicate with the second ink supply passages 39 are respectively formed in the surfaces of those channel forming plates 29. The portions of the grooves 30 are formed in channels 32 such that the surfaces of the channel forming plates 29 are sealingly coupled to a plate (sealing plate) 31 by use of silicone (sealing compound) which is hard to be deteriorated and aged by ink (FIG. 3). The channels 32 (grooves 30) are extended to the central portion of the cartridge case 20. Ink supply holes 33a and 33b for supplying ink from the channels 32 to the head body 21 are bored at locations corresponding to the tips of the channels 32 of the plate 31, in the present embodiment, in the direction perpendicular to the surface of the plate 31.

Namely, one longitudinal end portion of the respective grooves 30 are communicated with the ink cartridge through the second ink supply passages 39, and the other end portions are communicated with the head body 21 through at least one ink supply hole 33a. The respective grooves 30 are arranged such that the end portions facing the second ink supply passages 39 are separated from each other in comparison with the end portions facing the ink supply hole 33a. In other words, the end portions of the grooves communicated with the head body are converged.

A structure of mounting the plate 31 onto the channel forming plates 29 will be described in detail. A plurality of welding pins 34 (sixteen number of welding pins in the instance of FIG. 4) stand erect on the lower side of the channel forming plates 29, while surrounding the four grooves 30. Plural number of welding pins 34 are located around each of the grooves 30.

Figure 5A:
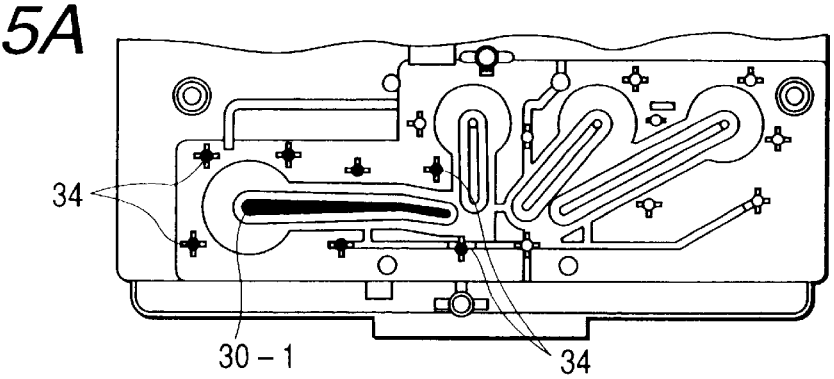
FIG. 5A–FIG. 5D are bottom views showing the cartridge case, the view useful in explaining a mounting structure of channel forming plates and a plate in the recording head of the first embodiment.
Figure 5B:
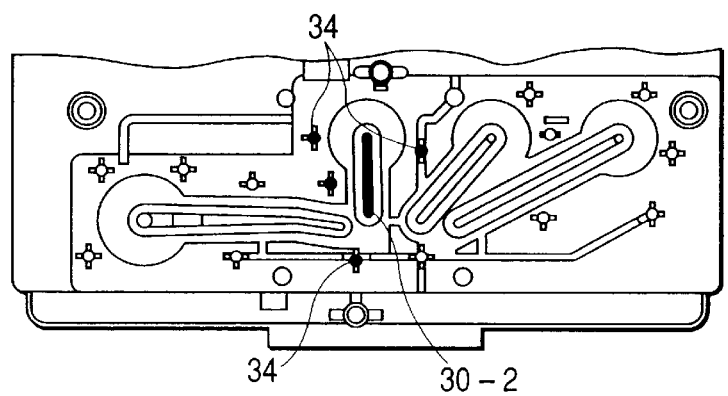
Figure 5C:
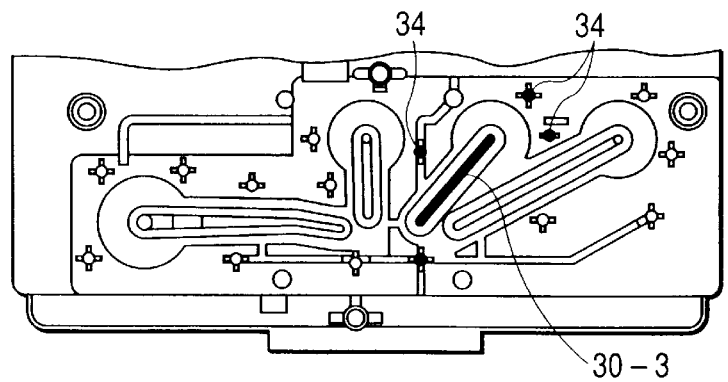
Figure 5D:
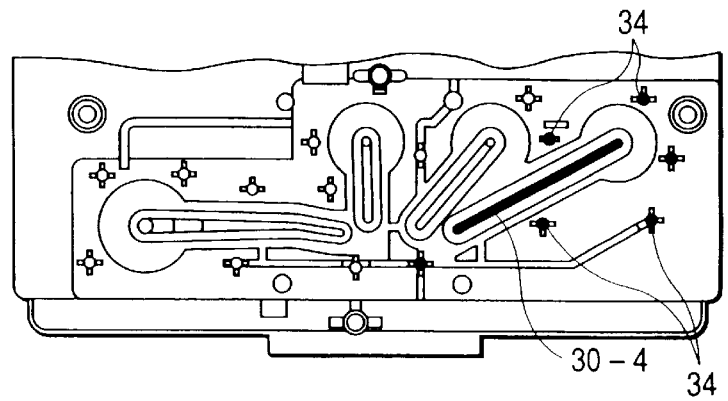

As shown in FIG. 5A, the welding pins 34 are provided at seven locations around the leftmost groove 30-1, for example, (the corresponding ones 30 and 34 are painted out in the figure, for ease of understanding). As shown in FIG. 5B, the welding pins 34 are provided at four locations around the second groove 30-2 counted from the left end in the figure. Similarly, as sown in FIGS. 5C and 5D, the welding pins 34 are provided at four and six locations around the third and fourth grooves 30-3 and 304, counted from the left in the figures. Thus, the welding pins 34 are provided at a plurality of locations around one groove 30, so that if an external force is applied to the plate 31, the mounting structure is hard to be unsteady and ink leakage is unlikely to occur.

Through holes 35 into which the welding pins 34 are to be inserted are bored at locations of the plate 31, which, respectively, correspond to the welding pins 34. The plate 31 is mounted on the channel forming plates 29 in a manner that the welding pins 34 are inserted into those through holes 35, and in this state, the tips of the welding pins 34 are welded and crushed (see FIG. 2).

The recording head may be assembled in the following way, for example. To start with, the cartridge case 20 is fixed in a state that its bottom side is directed upward. Silicone adhesive 36 is applied to portions around the grooves 30 of the channel forming plates 29. Then, the plate 31 is positioned on the channel forming plates 29, and as shown in FIG. 6, welding pins 34 are inserted into through holes 35. The tips of the welding pins 34 are pressed with heated caulking pins 45, so that the tips of the welding pins 34 are welded and crushed. Thereafter, the pressing by the caulking pins 45 are removed, and those welding pins are cooled down. The welding pins 34 are solidified, so that the plate 31 is fastened to the channel forming plates 29. In the figure, reference numeral 37 represents a support rib for supporting the plate 31.

Thus, in the recording head 18, a portion forming the channels 32 is composed of two types of plate-like members, the channel forming plates 29 and the plate 31. Therefore, the recording head 18 may be remarkably reduced in size when comparing with the related one in which the channels are formed by use of slanted holes. In addition, since it is configured that the end portions of the grooves 30 facing the head body 20 are closing with each other, the size of the head body 20 can be remarkably reduced irrespective with the size of the ink cartridge. Further, the assembling of the recording head is easy and hence it is easy to make automating of the assembling process of the recording head. Its manufacturing cost is low. Additionally, it is noted that the channels 32 are sealed with the sealing adhesive. For this reason, there is less chance that dust and others enter the channels 32.

Figure 7A:
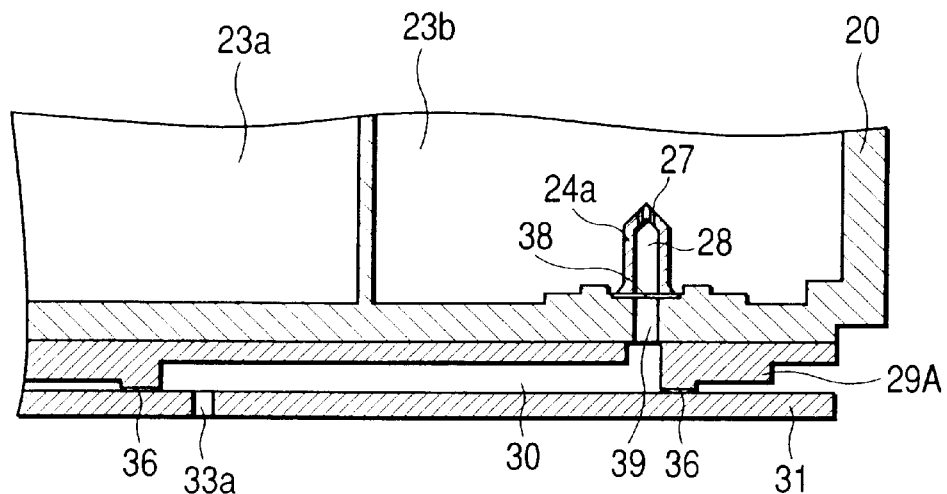
FIG. 7A and FIG. 7B are cross sectional views of one modified example of the ink jet recording head according to the first embodiment of the present invention.
Figure 7B:
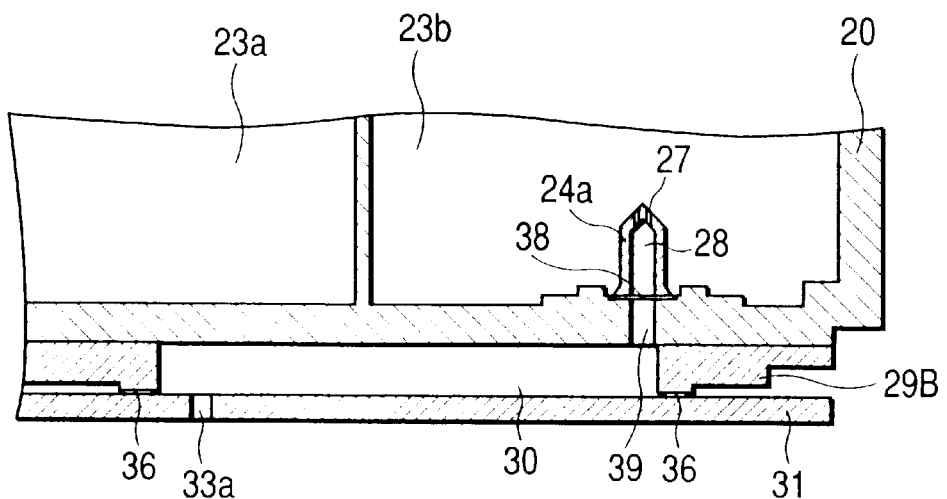

In the above embodiment, the channel forming plate 29 is integrally formed on the bottom face of the cartridge case 20, however, the channel forming plate 29 and the cartridge case 20 may be provided as separated members. For example, as shown in FIG. 7A, there may be configured that a channel forming plate 29A which defines a bottom portion and side walls of the grooves 30 is bonded to the bottom face of the cartridge case 20, and the opened side of the grooves are sealed by the plate 31. As shown in FIG. 7B, there may be configured that a channel forming plate 29B having through holes which define side walls of the grooves 30 is bonded to the bottom face of the cartridge case 20, and the opened side of the grooves are sealed by the plate 31.

Figure 8A:
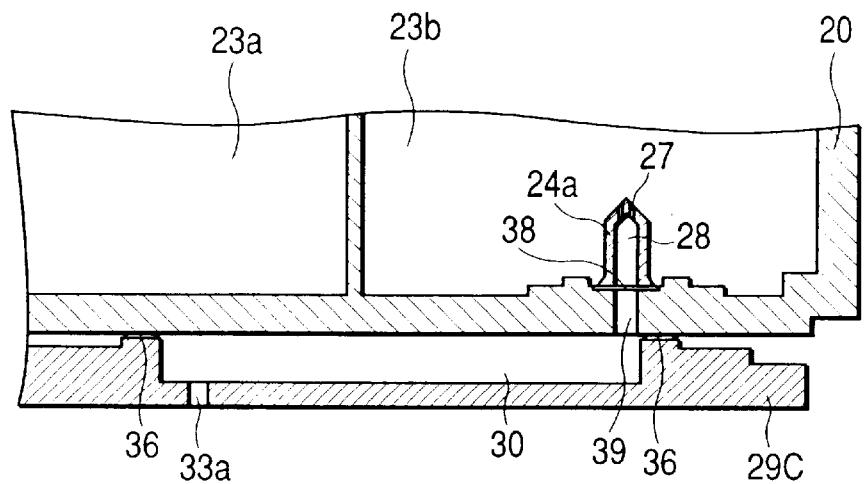
FIG. 8A and FIG. 8B are cross sectional views of another modified example of the ink jet recording head according to the first embodiment of the present invention.
Figure 8B:
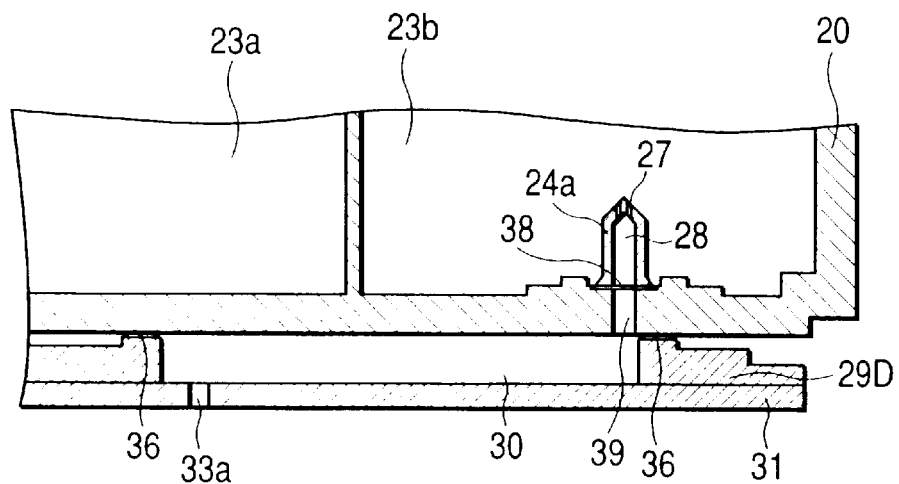

As shown in FIG. 8A, there may be configured that a channel forming substrate 29C is provided as an independent member and silicone adhesive 36 are applied to peripheral portion of the grooves 30 so that the opened side of the grooves 30 are sealed by the cartridge case 20. In this case, the cartridge case 20 serves as the sealing plate. As shown in FIG. 8B, there may be configured that a member 29D having through holes, a member such as the plate 31 for sealing opened side of the through holes to define a bottom portion of the grooves 30 are provided as separated members, and a channel forming plate are made by bonding the member 29D and the plate 31 with each other.

Figure 9A:
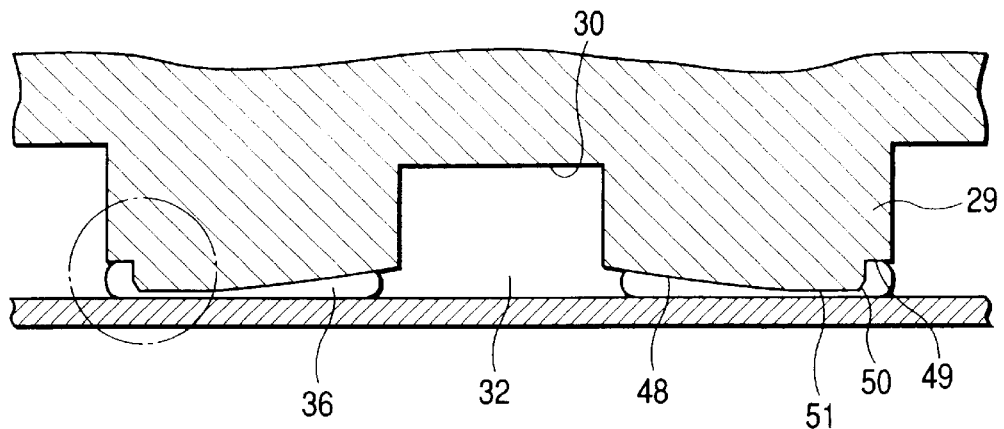
FIG. 9A is a cross sectional view showing a main portion of the channel forming plate and FIG. 9B is an enlarge view showing a portion enclosed by a dotted line in FIG. 9A.
Figure 9B:
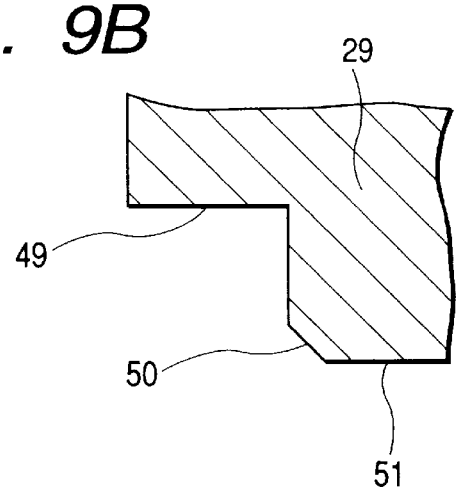

FIG. 9 is a cross sectional view for explaining the sealing portions between a channel forming plate and a plate, which form a second embodiment of the present invention.

The second embodiment is another joining structure of the channel forming plates 29 and the plate 31, and the remaining portions are similar to those in the first embodiment. The sealing portion between the channel forming plates and the plate will be described in detail.

As shown in FIG. 9, in the embodiment, a surface (lower surface in the figure) of each channel forming plate 29 is configured such that the peripheral portion of its groove 30, or the surface of the partition wall around the groove 30, which faces the sealing plate, is a slanted surface 48 being gradually slanted downward to the groove 30 (down slope). A step 49, which forms a recess to be coated with silicone adhesive 36, is provided outside the peripheral edge of the channel forming plate 29, or the slanted surface 48 of the partition wall around the grooves 30. Further, a flat portion 51 is present between the step 49 and the slanted surface 48. A corner demarcating the step 49 and the flat portion 51 is removed to form a tapered surface 50.

A slope of the slanted surface 48 is selected to be preferably within 5/1000 to 200/1000. Where the slope is smaller than 5/1000, a gap on a portion of the slanted surface 48 that is formed in a state that the surface of each of the channel forming plates 29 is sealed with the plate 31, is too small. Accordingly, it cannot hold the silicone adhesive 36 satisfactorily, and the silicone adhesive 36 is easy to flow over the gap. Where it exceeds 200/1000, the gap of the portion of the slanted surface 48 is too large, large air bubbles attach to the silicone adhesive 36.

Figure 10A:
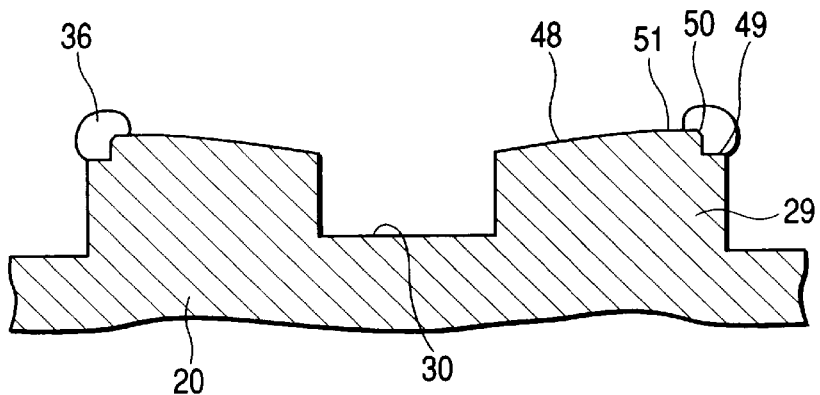
FIG. 10A–FIG. 10C are diagrams for explaining an assembling of the ink jet recording head of the second embodiment.

The recording head may be assembled in the following way, for example. To start with, as shown in FIG. 10A, the cartridge case 20 is fixed in a state that its bottom side is directed upward. Silicone adhesive 36 is applied to portions of the steps 49 of the partition walls.

Figure 6A:
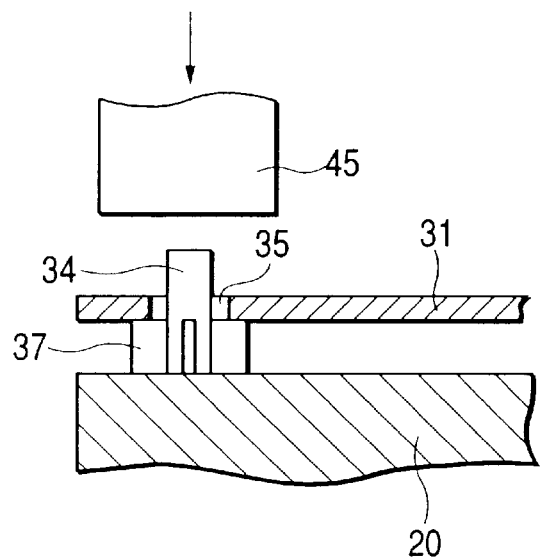
FIG. 6A is a cross sectional view showing a structure before caulking and FIG. 6b is a cross sectional view showing the structure after caulking.
Figure 6B:
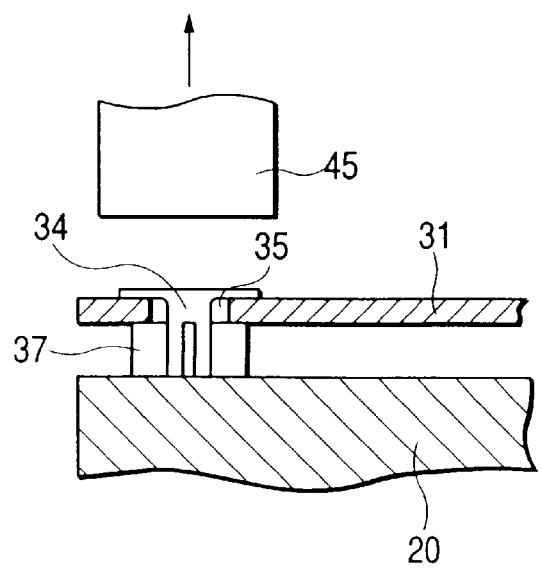
Figure 10B:
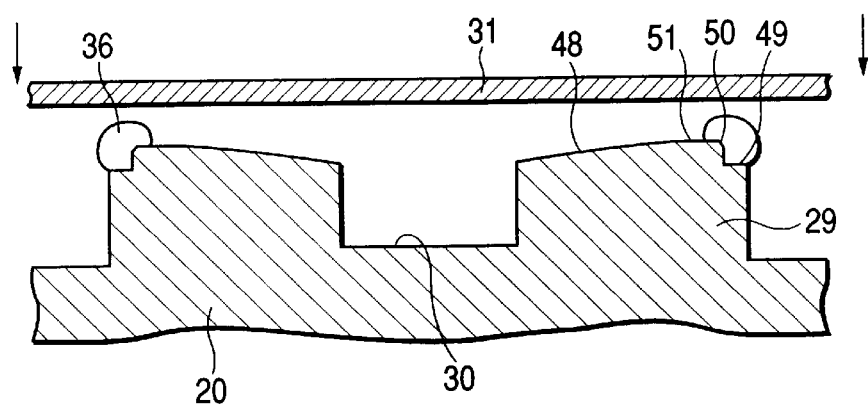

Subsequently, the plate 31 is positioned on the channel forming plates 29 and as shown in FIG. 10B, the plate 31 is placed on the surface of each channel forming plate 29. Further, as shown in FIG. 6A, the welding pins 34 of the cartridge case 20 are inserted into the through holes 35 of the plate 31. Then, the tips of the welding pins 34 are pressed with the heated caulking pins 45, so that as shown in FIG. 6B, the tips of the welding pins 34 are welded and crushed. As a result, the plate 31 is fastened to the channel forming plates 29.

Figure 10C:
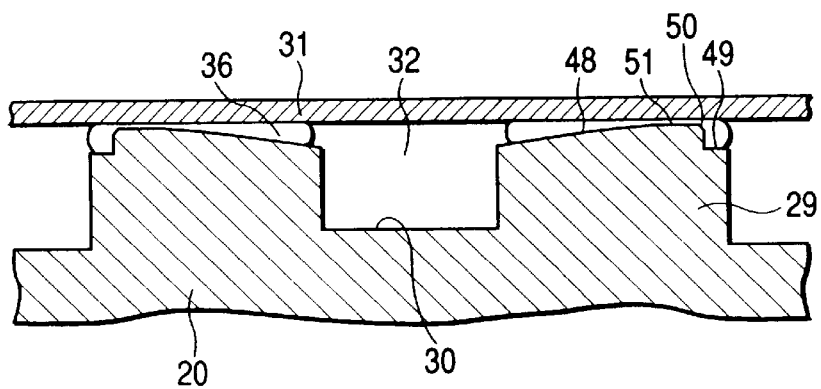

As shown in FIG. 10C, the silicone adhesive 36 applied to the step 49 is spread from the flat portion 51 up to the portion of the slanted surface 48, so w that the portions of the grooves 30 are sealed to form the channels 32. At this time, the silicone adhesive 36 applied to the step 49 is held back with the plate 31 since the tapered surface 50 is formed at the corner demarcating the step 49 and the flat portion 51. And when it spreads to the flat portion 51, the silicone adhesive 36 stands on the tapered surface 50, and there is no excessive flow of the silicone adhesive to the flat portion 51. Therefore, the silicone adhesive 36 is hard to flow out and into the channels 32.

Thus, in the recording head 18 of the present embodiment, as in the first embodiment, the portion forming the channels 32 is formed with the channel forming plates 29 and the plate 31. Therefore, the recording head is reduced in size and its assembling is easy, and its manufacturing cost is reduced. The surface, which faces the sealing plate, of the partition wall around each groove 30 of the channel forming plates 29 is a slanted surface 48 being gradually slanted downward toward the groove 30. A gap is formed on a portion of the slanted surface 48 in a state that the surface of each of the channel forming plates 29 is sealed with the plate 31. The silicone adhesive 36 is retained in each gap, so that it is hard to flow out of the gap and into the channels 32.

In the embodiment, a corner demarcating the step 49 and the flat portion 51 is removed to form a tapered surface 50. Alternatively, a rounded tapered surface may be formed thereat in place of it. Also in those cases, the advantageous effects similar to those mentioned above may be obtained.

Figure 11:
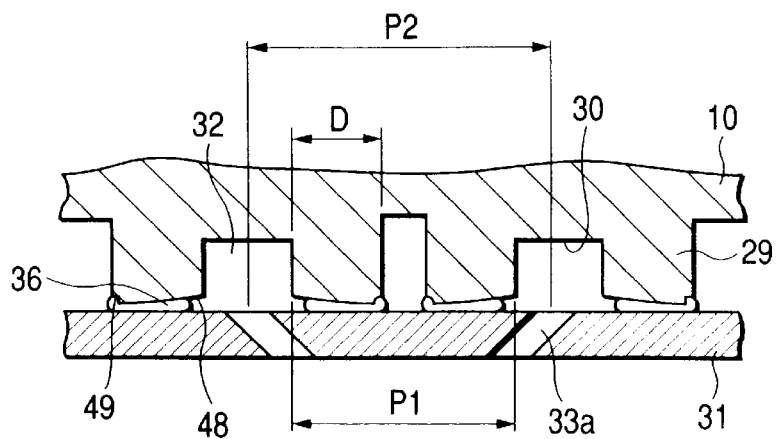
FIG. 11 is a cross sectional view showing a main portion of an ink jet recording head which is a third embodiment of the invention.

FIG. 11 is an enlarged view for explaining a channel forming plate and a plate which form a third embodiment, and FIG. 12 show plan and cross sectional views of a main portion of the plate.

The third embodiment is concerned with another ink supply hole communicatively interconnecting each passage 32 and the head body, and the remaining structure of it is substantially the same as of the second embodiment. A surface of each channel forming plate 29 is configured such that its surface, which faces the sealing plate, of the partition wall around the groove 30, is a slanted surface 48 being gradually slanted downward to the groove 30. A step 49, which forms a recess to be coated with silicone adhesive 36, is provided outside the slanted surface 48 of the partition wall around the grooves 30.

Figure 12A:
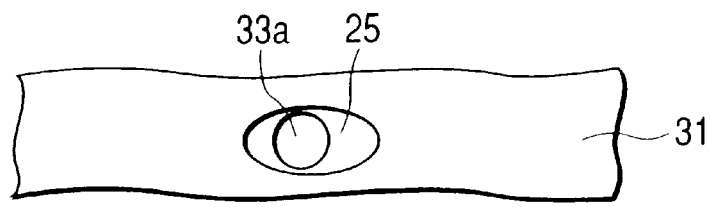
FIG. 12A is a plan view of the plate.
Figure 12B:
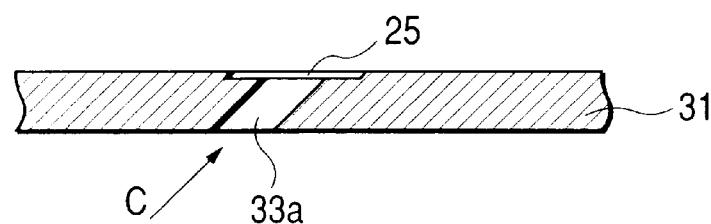
FIG. 12B is a cross sectional view of the same.
Figure 12C:
FIG. 12C is a bottom view of the same.
Figure 12D:
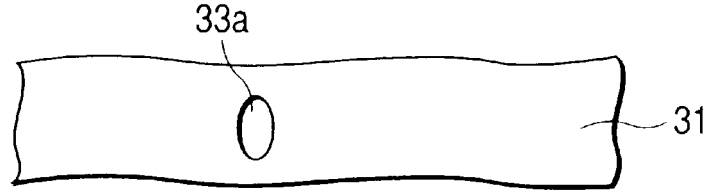
FIG. 12D is a view of the same when viewed in the direction of an arrow C.

Ink supply holes 33a of the plate 31, which correspond in position to the ends of the channels 32 (see FIG. 3), are bored through the plate 31 in such a fashion that the adjacent ink supply holes 33a are slanted with respect to the surface of the plate 31 so as to be shaped like V in cross section. Accordingly, a pitch of the ink supply holes 33a (P2 in the figure) on the side where the channels 32 are present is longer than a pitch (P1 in the figure) on the side where the head body 21 is present. The opening of each of the ink supply holes 33a is circular when viewed from the top and bottom thereof, as shown in FIGS. 10A and 10C. Accordingly, it is elliptical when viewed in the direction (arrow direction C in FIG. 12B) in which the ink supply hole 33a passes through the plate, as shown in FIG. 12D. A stepped portion 25, which is elliptical as viewed from top, is formed around each ink supply hole 33a of the plate 31. The stepped portion 25 is approximately 10 to 30 µm in depth. Ink supply holes 33b, which are each located apart from the end of the channels 32, are formed in the plate 31 in the direction perpendicular to the surface of the plate 31 (see FIG. 3).

The width D of the channel forming plate 29 is preferably 1.0 mm or longer over the entire circumference of the groove 30. If the width D is shorter than 1.0 mm, there is a fear that sealing is poor or sealing compound flows out and into the passage 32. Practically, the width D is within approximately 2.0 mm in order to avoid the increase of the size of the recording head 18.

A method of manufacturing the recording head 18 will now be described.

Figure 13A:
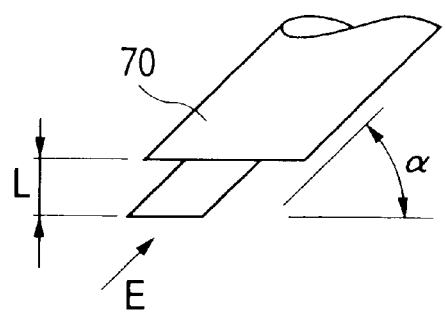
FIG. 13A is a side view of the draw pin.
Figure 13B:
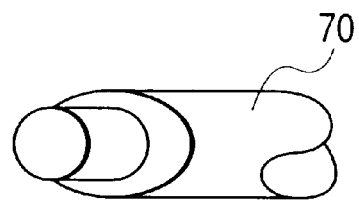
FIG. 13B is a bottom view of the same.
Figure 13C:
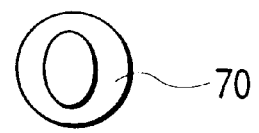
FIG. 13C is a view of the same when viewed in the direction of an arrow E.

A plate 31 used for the recording head 18 of the embodiment is formed by one-piece molding process such as injection molding process. In the molding process, ink supply holes 33a to be formed passing through the plate 31 are formed in the plate by use of draw pins 70 (supply hole forming pins) as shown in FIG. 13.

The draw pins 70 are each formed by applying predetermined working to the end portion of a pin being circular in cross section. The draw pin 70 is disposed at an angle (α in the figure) at which the ink supply holes 33a pass through the plate, and in this state its end portion of a predetermined length measured from its tip is shaped to be circular in cross section (see FIG. 13C). As a result, the end face of the draw pin 70, which is to be in contact with the mold face, is formed to be circular (see FIG. 13B). A length L of the worked end portion of the draw pin is somewhat shorter than the thickness of the plate 31, and its root side portion is formed to have a large diameter.

The draw pins 70 are used in combination with molds 72a and 72b having a molding space 71 in which a plate 31 is formed. Slide holes 73 are formed in the first mold 72a, while being each inclined, with respect to the mold face, at an angle α at which an ink supply hole 33a passes through the plate. The draw pins 70 are slidably inserted into those slide holes 73, respectively. In this state, the end faces of the draw pins 70 are brought into contact with the mold face (the face corresponding to the plate 31) of the second mold 72b.

Figure 14A:
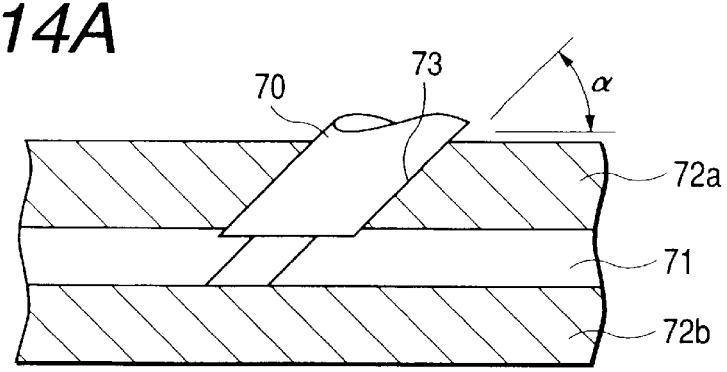
FIG. 14A shows a clamping state.
Figure 14B:
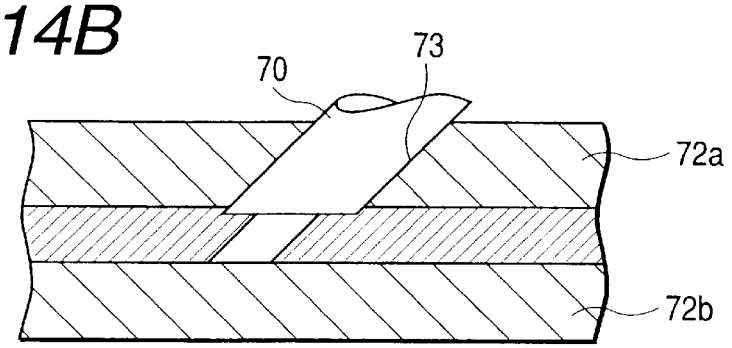
FIG. 14B shows an under-molding state and FIG. 14C shows a state after mold breaking.
Figure 14C:
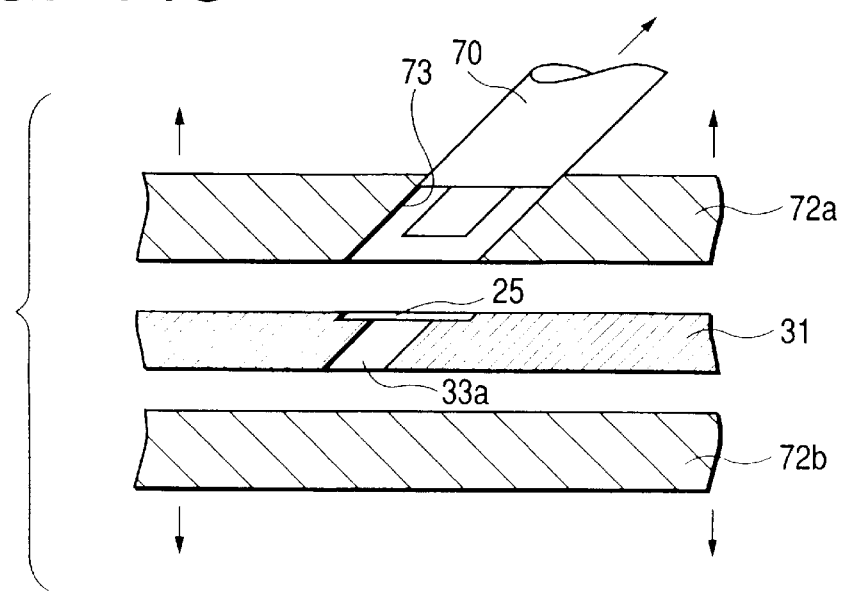
Figure 15:
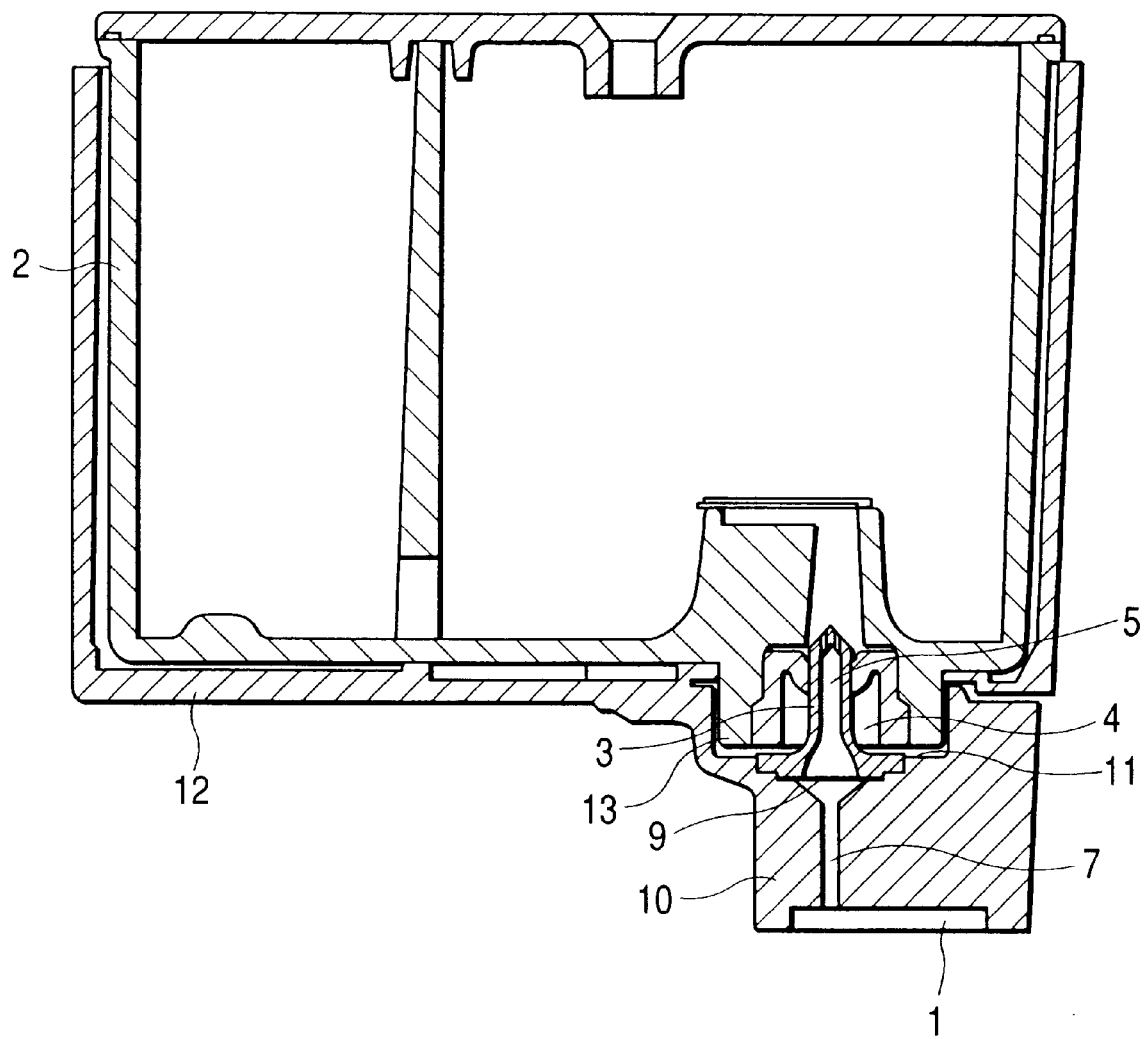
FIG. 15 is a cross sectional view showing a related ink jet recording head.
Figure 16:
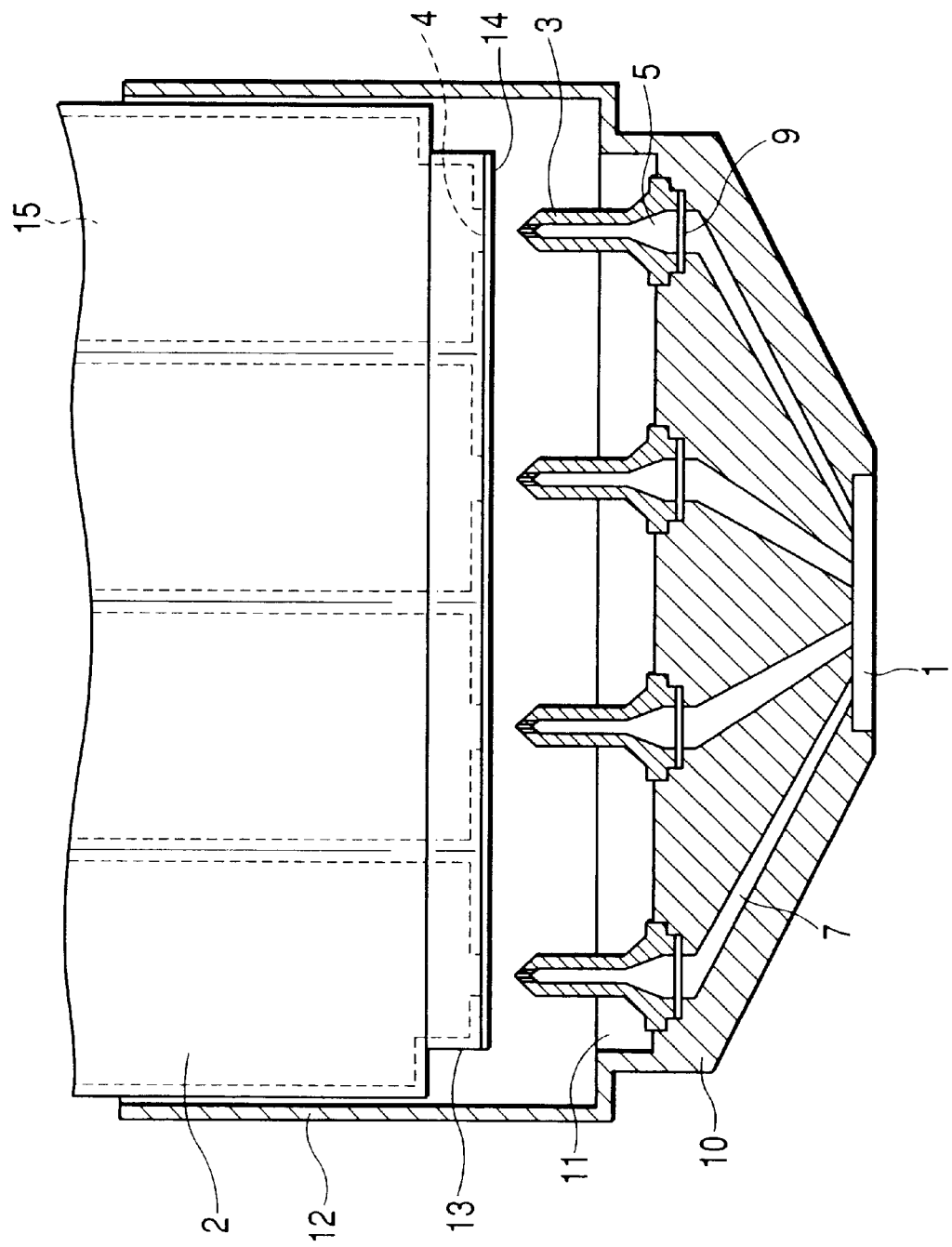
FIG. 16 is a cross sectional view showing the related ink jet recording head.
Figure 17A:
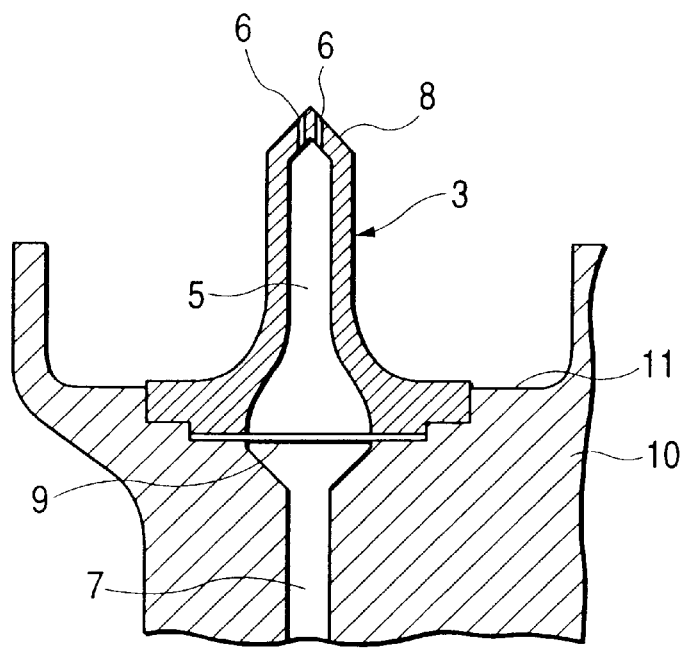
FIG. 17A is a cross sectional view showing a main portion of the recording head and FIG. 17B is a plan view showing an ink supply needle.
Figure 17B:
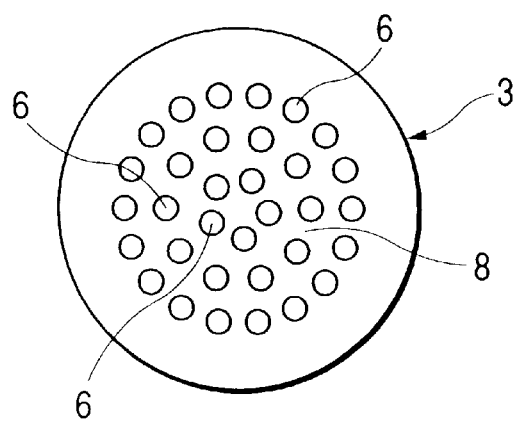

The plate 31 is formed by use of the molds 72a and 72b and the draw pins 70 in the following manner. To start, as shown in FIG. 14A, in state that the draw pins 70 are set in the first mold 72a, the first mold 72a and the second mold 72b are clamped. Then, as shown in FIG. 14B, the molding space 71 is filled with molten resin and cooled to be solidified. Thereafter, as shown in FIG. 14C, the draw pins 70 are slid in the root side direction to pull them from the molded product. Finally, the first mold 72a and the second mold 72b are vertically opened. In this way, the plate 31 is produced. Portions of the plate from which the draw pins 70 were pulled out are ink supply holes 33a.

Since the end faces of the draw pins 70 to be brought into contact with the mold face are shaped to be circular, the openings of the ink supply holes 33a are also circular in shape. The length L of the worked end portion of each of the draw pins 70 is somewhat shorter than the thickness of the plate 31, and its portion closer to the mold face of the first mold 72a is configured to have a large diameter. Because of this, a stepped portion 25 is formed around the peripheral edge of each ink supply hole.

And the cartridge case 20 is fixed in a state that its bottom 33a is directed upward. Silicone adhesive 36 is applied to the steps 49 around the grooves 30 of the channel forming plates 29. Then, the plate 31 is positioned on the channel forming plates 29, and the plate 31 is placed on the surfaces of the channel forming plates 29, and the welding pins 34 of the cartridge case 20 are inserted into the through holes 35 of the plate 31, respectively. The tips of the welding pins 34 are pressed with heated caulking pins 45, so that the tips of the welding pins 34 are welded and crushed. As a result, the plate 31 is fastened to the channel forming plates 29.

By using the manufacturing method described above, the recording head 18 may be manufactured at low cost. Since the openings of the ink supply holes 33a of the resultant plate 31 are circular, the manufacturing cost is not high, the sealing performance is not degraded, and air bubbles being caught in the passages less happens. Specifically, if the ink supply holes 33a obliquely passing through the plate are formed by use of normal pins circular in cross section, the openings of the ink supply holes are elliptical. On the other hand, the openings of the ink supply holes 33a of the plate 31 manufactured by the manufacturing method mentioned above are circular. Therefore, there is no need of making elliptical the openings of the ink supply pipes 16 and packing applied to those. Consequently, the manufacturing cost is low, good sealing is secured, and air bubbles are little caught in the passages.

Further, the length L of the worked end portion of each of the draw pins 70 is somewhat shorter than the thickness of the plate 31, and its portion closer to the mold face of the first mold 72a is configured to have a large diameter, and a stepped portion 25 is formed around the peripheral edge of each ink supply hole. Therefore, even if the working accuracy is not satisfactory, there is less chance that protrusions are formed along the circumferential edge of each of the openings of the ink supply holes 33a, and hence good sealing performance is secured.

While the silicone adhesive 36 is used for the sealing compound in the above-mentioned embodiments, it may be replaced with thermoplastic adhesive containing acrylic resin or vinyl resin as a main component, heat-hardening resin adhesive containing phenolic resin or epoxy resin as a main component, rubber adhesive containing natural rubber or synthetic rubber as a main component or others.

Also in those cases, the advantageous effects as of the above-mentioned embodiments are obtained. If the adhesive used is good in sealing performance and adhesion, the channel forming plates and the sealing plate may be fastened together not using the welding.

In the constructed recording head of the invention, a portion forming the ink supply channels of the recording head is composed of two types of plate-like members. Therefore, the recording head may be remarkably reduced in size when comparing with the related one in which the passages are formed by use of slanted holes.

The sealing plate is welded to the channel forming plates with the sealing plate being interposed therebetween. Therefore, there is less chance that dust and the like enter the channels. Further, the slanted holes requiring intricate work are not used, and the assembling is easy and manufacturing cost is low.

In the ink jet recording head, which is constructed such that the welding of the sealing plate to the channel forming plates is performed in a manner that welding pins standing erect on the channel forming plates are inserted into insertion holes of the sealing plate, and welded and deformed, the assembling of the recording head is easy and hence it is easy to make automating of the assembling process of the recording head. Welding residual substances are hard to be produced, while the ultrasonic welding is unlikely to yield them. Chance that dust and others enter the channels is further lessened.

In the ink jet recording head which is constructed such that the welding pins are formed at portions surrounding the grooves of the channel forming plates, respectively, or the welding pins are formed at a plurality of positions around each the groove of the channel forming plates, if an external force is applied to the sealing plate, the mounting structure of the plate and the channel forming plates is hard to be unsteady and ink leakage is unlikely to occur.

In the ink jet recording head which further comprises a filter for filtering ink supplied from the ink tank, and in which the passages guide ink having passed through the filter to the head body, no dust enter the passages which rejects the presence of dust and the like, and the recording head is extremely effective.

In the ink jet recording head in which the sealing compound is silicone resin, the sealing compound is hard to be deteriorated and aged by ink, and the ink leakage occurs less frequently.

In the ink jet recording head, the surface of the partition wall around each the groove, which faces the sealing plate, is a slanted surface being gradually slanted downward to the groove. Therefore, a gap on a portion of the slanted surface that is formed in a state that the surface of each of the channel forming plates is sealed with the sealing plate, is satisfactorily small. Accordingly, it can hold the sealing compound satisfactorily, and it is hard to flow over the gap.

The recording head is substantially free from the problem of the flow of the sealing compound into the passages, which is unavoidable in the related recording head. Further, the ink ejection trouble arising from attachment of air bubbles to the sealing compound is also solved.

In the ink jet recording head in which a step, which forms a recess to be coated with silicone compound, is provided outside the slanted surface of the partition wall of each the channel forming plate, the work to apply the sealing compound to the step is easy. The overflow of the sealing compound may be prevented by reducing the amount of sealing compound applied. In this case, if the amount of it is excessively reduced, control of the application of the sealing compound is impossible. In an extreme case, the supply of the sealing compound is interrupted, resulting in poor sealing. In this ink jet recording head, the sealing compound is applied to the step. Therefore, the amount of the sealing compound effectively contributing to the sealing is reduced when the sealing is effected by the sealing plate. For this reason, the overflow of the sealing compound can effectively be prevented without excessively reducing the amount of the sealing compound applied. The control of the amount of the sealing compound applied is also easy, and poor sealing is not caused.

In the ink jet recording head in which a slope of the slanted surface is selected to be preferably within 5/1000 to 200/1000, the gap on a portion of the slanted surface that is formed in a state that the surface of each of the channel forming plates is sealed with the sealing plate, is satisfactorily small. Accordingly, if air bubbles attach to the sealing compound, its amount is considerably small. Removal of the air bubbles from the sealing compound is difficult, thereby preventing poor ejection trouble.

In the ink jet recording head in which a flat portion is provided between the step and the slanted surface, is no chance of reducing the sealing effect between the channel forming plates and the sealing plate.

In the ink jet recording head in which a corner demarcating the step and the flat portion is removed to form a tapered surface, when the sealing compound applied to the step is held down by the sealing plate and spreads to the flat portion, the sealing compound stands on the tapered surface, and there is no excessive flow of the silicone adhesive to the flat portion. Therefore, prevention of the overflow of the sealing compound into the passages is further ensured.

In the ink jet recording head, if by boring ink supply holes for supplying ink of the passages to the head body in the sealing plate while being slanted with respect to a surface of the sealing plate, a pitch of the ink supply holes on the side where the head body is present is set to be equal to that of ink supply pipes of the head body, a pitch of the ink supply holes on the side where the passages are present is longer than that. Accordingly, a sufficient space is present, so that a sufficient width of the channel forming plate is secured in a portion of the channel forming plate corresponding to the ink supply hole. To fasten the sealing plate to the board surface, the sealing compound is applied thereto. If the sealing compound flows out and into the passages, the problems of attachment of air bubbles arise. To avoid this, it is necessary to separate the sealing compound coating portion from the passages. However, in the invention, such a problem of the related recording head that the sealing is poor and the sealing compound flows out into the passages is almost solved. The trouble caused by attaching air bubbles to the sealing compound, for example, poor ejection, is prevented.

In the ink jet recording head in which the width of each the channel w forming plate is 1.0 mm or longer over the entire circumference of each the groove, such a problem of the related recording head that the sealing is poor and the sealing compound flows out into the passages is almost solved. The trouble caused by attaching air bubbles to the sealing compound, for example, poor ejection, is prevented with certainty.

When a method of manufacturing the ink jet recording head of the invention is used, the ink jet recording head may be manufactured at low cost and in an easy manner.

In the jet recording head in which opening of each the ink supply hole opened to the head body side is circular, or in the method of manufacturing an ink jet recording head, the end face of each the supply hole forming pin, which is brought into contact with a mold face corresponding to the surface of the sealing plate, is circular in shape, the openings of the ink supply holes of the resultant plate are simple in shape, the manufacturing cost is not high, the sealing performance is not degraded, and air bubbles being caught in the passages less happens.

If the ink supply holes obliquely passing through the plate are formed by use of normal pins circular in cross section, the openings of the ink supply holes are elliptical. Therefore, it is necessary to shape the openings of the ink supply channels of the head body to be elliptical, and hence to shape the packing applied thereto to be also elliptical. Thus, the elliptical member needs to be used for the other member. The manufacturing cost of the overall device is increased. Further, the sealing is deteriorated, and air bubbles are easy to be caught. On the other hand, in the invention, the openings of the ink supply holes of the sealing plate are circular. Therefore, there is no need of making the elliptical openings of the ink supply channels and the elliptical packing applied to those. Consequently, the manufacturing cost is low, good sealing is secured, and air bubbles are little caught in the passages.

In the ink jet recording head in which a stepped portion is formed around each the ink supply hole of the sealing plate or in the method of manufacturing an ink jet recording head, a supply hole forming pins are each configured such that its end portion smaller than the thickness of the sealing plate has a circular shape in its cross section parallel to the mold face corresponding to the surface of the sealing plate, there is substantially eliminated the deterioration of the sealing at the openings of the ink supply holes.

Accordingly, in a case where the ink supply holes each having a circular opening are obliquely bored, pins formed by working the end portions of normal pins circular in cross section so as to be elliptical in cross section are used. In this case, if the length of the worked portion is equal to the dimension of the molding space, no problem arises. If the former is longer than the latter by working accuracy or tolerances, a protruded portion will be formed at the peripheral edge of the opening of each ink supply hole. When the board surface is sealed with the sealing plate with the sealing compound interposed therebetween, a gap will be formed between the sealing plate and the board surface. Because of this gap, there is a danger that the sealing performance at this portion is deteriorated.

In the invention, a stepped portion is formed around the peripheral edge of each ink supply hole. Therefore, even if the working accuracy is not satisfactory, there is less chance that protrusions are formed along the circumferential edge of each of the openings of the ink supply holes, and hence good sealing performance is secured.

What is claimed is:

1. An ink jet recording head comprising:
a head body from which ink drops are ejected;
a channel forming plate provided with a plurality of grooves, each of the grooves having at least an opened side and being in communication with an associated ink tank;
a sealing plate for sealing each opened side of the grooves, the sealing plate being formed with through-holes each being in communication with an associated groove and the head body,
wherein a distance between respective first portions of adjacent grooves located where said grooves are in communication with the associated through-holes is shorter than a distance between respective second portions of the adjacent grooves located where said grooves are in communication with the associated ink tanks.

2. The ink jet recording head as set forth in claim 1, wherein the channel forming plate integrally includes a holder member for holding the ink tank, and the sealing plate is bonded to the holding member.

3. The ink jet recording head as set forth in claim 1, wherein the channel forming plate is provided as an independent member.

4. The ink jet recording head as set forth in claim 3, wherein the channel forming plate defines at least a bottom portion and side walls of the respective grooves.

5. The ink jet recording head as set forth in claim 3, wherein the channel forming plate includes through holes which respectively define side walls of the grooves.

6. The ink jet recording head as set forth in claim 1, wherein one longitudinal end portion of the respective grooves arc communicated with the ink tank, and the other end portions are communicated with the head body.

7. The ink jet recording head as set forth in claim 1, wherein a plurality of kinds of ink are ejected from the head body, and each of the grooves are provided so as to be associated with a respective ink kind.

8. The ink jet recording head as set forth in claim 1, wherein sealing compound is provided on the channel forming plate at least around the grooves.

9. The ink jet recording head as set forth in claim 8, wherein the channel forming plate and the sealing plate are fastened together with the sealing compound being located therebetween.

10. The ink jet recording head as set forth in claim 8, wherein the sealing compound is made of silicone resin.

11. The ink jet recording head as set forth in claim 1, wherein the sealing plate is welded to the channel forming plate.

12. The ink jet recording head as set forth in claim 11, wherein a welding pin is provided on the channel forming plate and a through hole is formed in the sealing plate, and
wherein the welding is performed by melting the welding pin inserted into the through hole.

13. The ink jet recording head as set forth in claim 12, wherein the welding pin is provided a portion surrounding the grooves.

14. The ink jet recording head as set forth in claim 13, wherein a plurality of welding pins are provided so as to surround the grooves.

15. The ink jet recording head as set forth in claim 1, further comprising a filter for filtering ink supplied from the ink tank, and
wherein the ink supply channel guides ink having passed through the filter to the head body.

16. The ink jet recording head as set forth in claim 1, wherein the grooves are defined by a wall portion standing erect on the channel forming plate, and wherein a top face of the wall portion is gradually slanted downward to the grooves.

17. The ink jet recording head as set forth in claim 16, wherein a stepped portion on which sealing compound is to be applied is formed on an outer periphery of the wall portion.

18. The ink jet recording head as set forth in claim 17, wherein a flat portion is provided between the stepped portion and the slanted surface.

19. The ink jet recording head as set forth in claim 18, wherein a corner demarcating the stepped portion and the flat portion is removed to form a tapered surface.

20. The ink jet recording head as set forth in claim 16, wherein a slope of the slanted face is selected to be preferably within 5/1000 to 200/1000.

21. The ink jet recording head as set forth in claim 1, wherein the sealing plate is provided with ink supply holes for supplying ink from the respective ink supply channels to the head body, and wherein the ink supply holes are bored in the sealing plate obliquely such that an interval of openings of the respective holes on the side facing the channel forming plate is longer than an interval of openings of the respective holes on the side facing the head body.

22. The ink jet recording head as set forth in claim 21, wherein the groove is defined by a wall portion standing erect on the channel forming plate, and wherein the width of the wall portion is 1.0 mm or longer over the entire circumference of the grooves.

23. The ink jet recording head as set forth in claim 21, wherein the respective openings of the ink supply holes facing the head body is circular.

24. The ink jet recording head as set forth in claim 21, wherein a stepped portion is formed around the respective openings of the ink supply holes facing the channel forming plate.

25. A method of manufacturing an ink jet recording head said method comprising:

disposing supply hole forming pins extending obliquely with respect to an inner face of a mold having a molding space in which a sealing plate is to be formed, the inner face corresponding to a surface of the scaling plate;

filling the molding space with molding material;

solidifying the molding material; and pulling out the supply hole forming pins from the molded product to form the ink supply holes.

26. The manufacturing method as set forth in claim 25, wherein both tip ends of the respective supply hole forming pins abutting against the inner face of the mold are circular in shape.

27. The manufacturing method as set forth in claim 26, wherein one end portion of the respective supply hole forming pins which corresponds to the opening of the ink supply hole facing the channel forming plate is configured to have a large diameter.

* * * * *